US012611848B2

(12) United States Patent
Toni

(10) Patent No.: US 12,611,848 B2
(45) Date of Patent: Apr. 28, 2026

(54) SEALABLE AND EASY OPENING POLYESTER FILMS

(71) Applicant: Cryovac, LLC, Charlotte, NC (US)

(72) Inventor: Enrico Toni, Fossombrone (IT)

(73) Assignee: Cryovac, LLC, Charlotte, NC (US)

( * ) Notice: Subject to any disclaimer, the term of this patent is extended or adjusted under 35 U.S.C. 154(b) by 103 days.

(21) Appl. No.: 16/975,432

(22) PCT Filed: Feb. 27, 2019

(86) PCT No.: PCT/EP2019/054897
§ 371 (c)(1),
(2) Date: Aug. 25, 2020

(87) PCT Pub. No.: WO2019/166509
PCT Pub. Date: Sep. 6, 2019

(65) Prior Publication Data
US 2020/0406591 A1 Dec. 31, 2020

(30) Foreign Application Priority Data

Feb. 27, 2018 (EP) ..................................... 18158885

(51) Int. Cl.
*B32B 27/08* (2006.01)
*B32B 27/36* (2006.01)
*B65D 77/20* (2006.01)
(52) U.S. Cl.
CPC .............. *B32B 27/08* (2013.01); *B32B 27/36* (2013.01); *B65D 77/2024* (2013.01); *B32B 2250/244* (2013.01); *B32B 2270/00* (2013.01); *B32B 2307/31* (2013.01); *B32B 2307/518* (2013.01); *B32B 2307/736* (2013.01); *B32B 2439/40* (2013.01); *B32B 2439/70* (2013.01); *B32B 2439/80* (2013.01)

(58) Field of Classification Search
CPC .............. B32B 27/36; B32B 2307/736; B32B 2307/31; B32B 2250/244
See application file for complete search history.

(56) References Cited

U.S. PATENT DOCUMENTS

| 4,120,716 | A | | 10/1978 | Bonet | |
|---|---|---|---|---|---|
| 4,841,605 | A | | 6/1989 | Schuierer | |
| 5,458,965 | A | * | 10/1995 | Yoshinaka | B32B 7/12 428/323 |
| 6,663,974 | B2 | * | 12/2003 | Kelch | B32B 27/08 428/458 |
| 7,211,306 | B2 | | 5/2007 | Peiffer et al. | |
| 2003/0198537 | A1 | | 10/2003 | Larsen et al. | |
| 2005/0079252 | A1 | | 4/2005 | Kendig et al. | |
| 2005/0282025 | A1 | * | 12/2005 | Brown | B32B 27/08 428/474.4 |
| 2017/0129222 | A1 | * | 5/2017 | Baralon | B32B 27/327 |

FOREIGN PATENT DOCUMENTS

| EP | 1681245 | A1 | | 7/2006 | |
|---|---|---|---|---|---|
| EP | 2805821 | A1 | * | 11/2014 | B29C 55/023 |
| EP | 2955128 | A1 | * | 12/2015 | B32B 1/02 |
| JP | 2006205527 | A | * | 8/2006 | |
| JP | 2015066802 | A | * | 4/2015 | |
| WO | 2007093495 | A1 | | 8/2007 | |
| WO | WO-2017153439 | A1 | * | 9/2017 | B32B 15/046 |

OTHER PUBLICATIONS

English machine translation of the description of JP-2015066802-A (Year: 2015).*
English machine translation of the description of JP-2006205527-A (Year: 2006).*

* cited by examiner

*Primary Examiner* — Thomas J Kessler
(74) *Attorney, Agent, or Firm* — Jason R. Womer

(57) ABSTRACT

The invention discloses a fully thermoplastic heat sealable multilayer polyester based film that forms hermetic and easy opening packages with polyester containers or pouches and the use of this film in food packaging.

21 Claims, No Drawings

SEALABLE AND EASY OPENING POLYESTER FILMS

TECHNICAL FIELD

The present invention relates to a multilayer polyester based film and its use as lidding film and in manufacturing pouches for food packaging. The film provides a hermetic and easy opening package when heat sealed to form pouches or when sealed onto polyester containers.

BACKGROUND ART

Packaging systems comprising a rigid heat-stable container covered with a thin flexible thermoplastic film sealed onto it are commonly used for hermetically packaging food products, in particular ovenable products such as ready meals (especially meat-based ready meals), vegetables, meat, fresh or frozen ready to cook meals, and the like.

The containers employed to this end are made of different materials and shapes, depending on the product to be packaged and the specific end-use.

For example, containers made or coated with polyethylene terephthalate (PET), in particular crystalline PET (CPET), which can withstand high temperatures, are especially suitable for the packaging of ready meals, fresh or frozen, that only require heating to be ready for consumption. Heating can be carried out in a microwave or in a conventional oven.

Amorphous PET (APET) containers are commonly used for the packaging of cold food, in particular moist or respiring food products, such as fruits and vegetables.

Another material commonly used for the containers is recycled polyester (RPET).

Lidding films used in this type of packaging are usually polyester films that are heat sealed to the rim or flange of the container. These films should have excellent optics and suitable barrier properties and high thermal stability at standard food heating or cooking temperatures. To improve the heat sealability of the lidding films to the container, a heat sealable layer of a lower temperature melting material, may be provided on the relevant portions of the film and/or of the container.

The heat sealable layer of the film may be coextruded with a PET base layer simultaneously through a single die as described, for example, in EP1529797 and WO2007/093495. Alternatively, the heat sealable layer may be solvent- or extrusion-coated over a PET base layer.

The sealing of the lidding film to the container should be sufficiently strong to close the container hermetically, in order to avoid any leakage of material from the container to the exterior as well as any contamination of the product contained in the packaging during storage, handling and distribution. However, when sealed under the conditions needed to obtain the desired hermeticity, many polyester film lids do not open easily or show tearing when peeled off the containers. This results in packages that are not user friendly since they require the use of tools or utensils to open. Furthermore, these packages have the inconvenience that upon tearing residues of the lidding films may fall into the packaged product.

The need is therefore strongly felt to develop polyester based lidding films that, when heat sealed to polyester based containers, show hermeticity and the correct balance in the bonding forces of the different layers so as to provide easy opening properties. In particular, there is the need to develop easy opening lidding films to be sealed to polyester based containers that detach completely from the container when opening the package, to ensure recyclability of the polyester container. Another need is to provide easy opening lidding films to be sealed to polyester based containers, with the highest possible content of polyesters with respect to the other components of the film: the recyclability of polyesters in fact would make such films more sustainable and appreciated by consumers and would allow the recyclability of the whole package.

Also, there is the need to provide polyester based flexible containers, such as bags or pouches which, after sealing, can be easily opened without using cutting devices without tearing of the film, and which do not show fringes at opening.

SUMMARY OF INVENTION

The present inventors have now found that in a multilayer polyester film, the presence of an inner layer comprising a major proportion of polyester and at least 1 wt % of a polyolefin, and/or an ethylene vinyl acetate copolymer, and/or an ethylene (meth)acrylate/(meth)acrylic acid copolymer, interposed between the polyester heat sealable layer and another polyester layer, imparts to the film excellent easy opening properties, without compromising the film optical properties.

The above layers combination allows preparing films having a sealant layer with a composition optimized to obtain high hermeticity when sealed to a polyester based container and at the same time a very easy opening of the package obtained and an improved recyclability of the package, which is mostly made of polyesters.

In fact, as will be demonstrated in the experimental portion, the films of the invention open easily and without tearing, when sealed hermetically onto PET trays.

The specific combination of the above three layers of the film provides an equilibrium of forces that results in a rupture by cohesive failure within the film when a force is applied to the film to detach it from a substrate.

Accordingly, a first object of the present invention is a fully thermoplastic heat sealable, optionally oriented, multilayer polyester based film comprising at least the following layers:

1) a heat-sealable polyester based outer layer;
2) an inner layer placed between layer 1) and layer 3) comprising a major proportion of one or more polyesters and at least 1 wt %, with respect to the total weight of the layer, of one or more further polymers selected from the group consisting of polyolefins, ethylene vinyl acetate copolymers (EVA), ethylene (meth)acrylate/(meth)acrylic acid copolymers and mixtures thereof; and
3) a polyester based layer.

In the present film layer 2) preferably adheres to layer 1) and/or to layer 3).

A second object of the invention is a package comprising a container, a product placed into the container, and a lid made of the film according to the first object of the present invention, wherein the heat sealable layer of the film faces the product and the film is hermetically sealed onto said container, thus enclosing the product.

A third object of the present invention is the use of the film according to the second object of the invention for packaging food.

A fourth object of the present invention is a flexible container obtainable by heat-sealing a film according to the first object of the invention on itself, or by heat-sealing two films, of which at least one is a film according to the first object of the invention, wherein the sealant layer of the film(s) preferably faces the inside of the container.

A fifth object of the present invention is a package comprising the flexible container according to the fourth object and a product placed into said flexible container; optionally, the product can further be placed in a rigid or semi-rigid container.

Definitions

The term "polyester" is used herein to refer to both homopolyesters and copolyesters.

The term "homopolyesters" refers to polymers obtained from the condensation of one dicarboxylic acid with one diol. Suitable homo-polyester resins are, for instance, polyesters of ethylene glycol and terephthalic acid, i.e. poly (ethylene terephthalate) (PET).

The term "copolyesters" refers to polymers obtained from the condensation of at least one dicarboxylic acid with at least two different diols or at least two different dicarboxylic acids with at least one diol.

The dicarboxylic acid may be aliphatic dicarboxylic acids, among which the $(C_3-C_{19})$alkanedioic acids are particularly suitable, in particular succinic acid, sebacic acid, adipic acid, azelaic acid, suberic acid or pimelic acid; cycloaliphatic dicarboxylic acids, among which cyclohexanedicarboxylic acids (in particular cyclohexane-1,4-dicarboxylic acid) are preferred; aromatic dicarboxylic acids such as terephthalic acid, isophthalic acid, phthalic acid, naphthalic acid, or 2,5-, 2,6- or 2,7-naphthalenedicarboxylic acid.

Preference is given to polyesters that contain ethylene units and include, based on the dicarboxylate units, at least 90 mol %, more preferably at least 95 mol %, of terephthalate units. The remaining monomer units are selected from other dicarboxylic acids or diols.

The diols may be straight chained or branched. These may be, for example, aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Examples of suitable copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Other suitable copolyesters are glycol-modified polyesters, i.e. copolyesters obtained by copolymerization of a dicarboxylic acid and at least two diols; typical glycol-modified polyesters are, for example, PETG, obtained by copolymerization of terephthalic acid, ethylene glycol and a further glycol, for example cyclohexanedimethanol.

As used herein, the expression "a fully thermoplastic film" refers to a film substantially made of thermoplastic resins. Substantially made of thermoplastic resins means that the film is made of at least 95%, preferably at least 98% by weight, most preferably it consists of thermoplastic resins.

As used herein, the expression "a thermoplastic layer" refers to a layer substantially made of thermoplastic resins.

As used herein, the expression "thermoplastic resins" refers to resins, preferably to synthetic resins, that become plastic on heating and harden on cooling, without appreciable change of properties.

As used herein, the expression "a polyester based film or a polyester based layer" refers to a film or a film layer, respectively, substantially made of polyesters.

As used herein, the expression "a film or a layer substantially made of polyesters" refers to a film or film layer made for at least 60%, 70%, 80%, 90%, 95% by weight of polyesters, including homopolyesters or copolyesters as previously defined or their admixtures.

As used herein, the term "major proportion" of one or more polyesters" in a layer of the film means that more than 50% by weight of said resin is present in said layer.

As used herein the expression "amorphous" referred to a polyester, refers to a polyester with an absence of a regular three-dimensional arrangement of molecules or subunits of molecules extending over distances, which are large relative to atomic dimensions. However, regularity of structure may exist on a local scale (see "Amorphous Polymers" in Encyclopedia of Polymer Science and Engineering, 2ndEd pp 789-842, J. Wiley & Sons Inc 1985). In particular, the term refers to a polyester having no measurable melting point (less than 0.5 cal/g) by differential scanning calorimetry (DSC) or no heat of fusion as measured by DSC using for example ASTM 3417-83. The term also includes polyesters that are obtained and marketed under a (semi)crystalline form but become amorphous after they are heated during extrusion, such as for instance Eastobond 19412 by Eastman Chemical. Suitable amorphous polyesters are those derived from an aliphatic diol and a cycloaliphatic diol with one or more, dicarboxylic acid(s), preferably an aromatic dicarboxylic acid, for example copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65.

As used herein the expression "(semi)crystalline polyester" refers to a polyester that does not fall within the above definition of amorphous polyester and which has a measurable melting point (measured by DSC using ASTM 3418).

As used herein, the term "polyolefin" is used with reference to any thermoplastic polymer deriving from polymerisation of one or more simple olefins, such as ethylene, propylene and butene. The polymer may be a homopolymer, consisting of repeating units of one single olefin or a co-polymer, consisting of a major proportion of one olefin and a minor proportion of one or more other olefins co-polymerisable therewith.

The term polyolefin specifically includes ethylene homo-e copolymers, butene homo-e co-polymers, propylene homo-e co-polymers and the like.

As used herein the terms "ethylene alpha olefin copolymer" identify copolymers of ethylene, comprising a major portion of ethylene and a minor proportion of one or more alpha-olefins comonomers, preferably $(C_4-C_{10})$-alpha-olefins, such as 1-butene, 1-hexene and/or 1-octene. Depending on the composition in monomers and polymerization process employed, polymers with a different degree of branching and a different density can be obtained. For example, the above term include polymers such as linear low density polyethylene (LLDPE) with a density usually in the range of from about 0.900 g/cc to about 0.930 g/cc, linear medium density polyethylene (LMDPE) with a density usually in the range of from about 0.930 g/cc to about 0.945 g/cc, and very low and ultra low density polyethylene (VLDPE and ULDPE) with a density lower than about 0.915 g/cc, typically in the range 0.868 to 0.915 g/cc.

As used herein, the term "ethylene (meth)acrylate/(meth) acrylic acid copolymer" refers to a copolymer of ethylene with (meth)acrylate esters or (meth)acrylic acid.

As used herein, the term "copolymer of ethylene with (meth)acrylate esters" refers to a copolymer of ethylene with methacrylate or acrylate esters. For example, the term includes ethylene ethyl (meth)acrylate co-polymer, ethylene-butyl (meth)acrylate co-polymer, ethylene methyl (meth)acrylate co-polymer and the like. The copolymer typically contains between 15 to 40%, preferably about 20% by weight of acrylate or methacrylate units.

As used herein, the term "copolymer of ethylene with (meth)acrylic acid" refers to a copolymer of ethylene with acrylic or methacrylic acid.

As used herein, the term "propylene copolymer" refers to propylene co- or ter-polymers comprising a major portion of propylene and a minor proportion of one or more alpha-olefins comonomers, such as ethylene or butylene. The term specifically includes propylene/ethylene and propylene/ethylene/butylene copolymers.

As used herein, the term "butylene copolymer" refers to butylene co- or ter-polymers comprising a major portion of butylene and a minor proportion of one or more alpha-olefins comonomers, such as ethylene or propylene.

As used herein the term "polybutylene" refers to homopolymers or co-polymers of butylene.

As used herein, the term "ethylene-vinyl acetate copolymer" or "EVA" refers to a copolymer formed from ethylene and vinyl acetate monomers or ethylene, vinyl acetate and carbon monoxide monomers, wherein the ethylene derived units in the copolymer are present in major amounts; preferably between about 60% and 98% by weight and the vinyl acetate and monoxide derived units in the copolymer are present in minor amounts, preferably between about 2% and about 40% by weight.

As used herein the term "modified" refers to a polymer modified with an anhydride functionality, either grafted onto the polymer or copolymerised therewith. The anhydride functionality can be an anhydride of maleic acid, crotonic acid, citraconic acid, itaconic acid, fumaric acid, etc., and is inclusive of derivatives of such functionalities, such as acids, esters, and metal salts derived therefrom.

As used herein the term "anhydride modified ethylene alpha olefin copolymer" or "anhydride modified ethylene methylacrylate copolymer" refers to such polymers having an anhydride functionality associated therewith, either grafted onto the polymer or copolymerised therewith. The anhydride functionality can be an anhydride of maleic acid, crotonic acid, citraconic acid, itaconic acid, fumaric acid, etc., and is inclusive of derivatives of such functionalities, such as acids, esters, and metal salts derived therefrom.

As used herein the term "ionomer" or "neutralized" referred to an ethylene (meth)acrylic acid copolymer refers to an ethylene (meth)acrylic acid copolymer, partially neutralized with a mono or divalent metal ion, such as zinc, lithium, sodium, potassium, calcium and magnesium. Commercially available resins of this kind are Surlyn by Dupont.

As used herein, the expression "heat sealable layer", refers to the outer layer of the film involved in the heat sealing of the film to a container, as herein defined.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextruded film" refers to a film obtained by coextrusion. The term "coextrusion" refers to the process of extruding two or more molten thermoplastic materials through a single die with two or more orifices arranged so that the extrudates merge and weld together into a laminar structure before chilling, i.e., quenching.

As used herein, the term "easy opening package" refers to a package made of a lidding film heat sealed to a container, wherein the seal between the lidding film and the container is strong enough to guarantee hermeticity of the package during its life-cycle but allows opening of the package manually by applying a force to separate the lid from the tray. This term also refers to flexible packages such as bags or pouches made by one or more films, wherein the seal(s) which closes the pouch is strong enough to guarantee hermeticity of the package during its life-cycle but allows manual opening of the package. The easy opening of the package may occur by cohesive failure mechanism. As used herein, "cohesive failure" means that, upon application of a force to open the package (by separating the lidding film from the container or the sealed edges of a flexible container), the film breaks internally in one of its layers. Generally speaking, in the cohesive failure mechanism the breakage may occur within the sealant layer or within an inner layer of the film. With reference to the present invention, "easy opening" is used to indicate opening by cohesive failure.

As used therein "easy opening film" refers to a film that forms an easy opening seal when sealed as a lid onto a container or sealed upon itself or upon another film to form a flexible container.

As used herein, the term "adheres", as applied to layers, refers to adhesion of the subject layer to the object layer by direct contact with each other, without a tie layer, an adhesive, or other layer therebetween.

In contrast, as used herein, the word "between", as applied to a layer expressed as being between two other specified layers, includes both direct adherence of the subject layer to the two other layers it is between, as well as a lack of direct adherence to either or both of the two other layers the subject layer is between, i.e. one or more additional layers can be imposed between the subject layer and one or more of the layers the subject layer is between.

As used herein, the term "container" refers to any hollow rigid or semi-rigid object suitable for supporting and containing a product. Suitable examples of containers are, for instance, a tray, a bowl, a dish, a box, a cup; preferably the container is a tray. The container is optionally provided with a sealing area, such as a sealing flange, suitable for being sealed to the heat sealable layer of the film of the present invention.

As used herein the term "flexible container" refers to a container obtainable by heat-sealing a single piece of film in the form of an envelope, a bag or a pouch or by heat sealing two identical or different films. Bags or pouches include, for example: lay-flat, end-seal bags made from a seamless tubing and having an open top, first and second folded side edges, and an end seal across a bottom of the bag; lay-flat side seal bags made from a seamless tubing and having an open top, a folded bottom edge and first and second side seals; lay flat, V-shaped side seal bags made from a seamless tubing and having an open top, a folded bottom edge and first and second side seals, which may be completely angled with respect to the open top, thus providing a triangular bag or partially straight (i.e. perpendicular to the open top) and partially angled, thus providing a trapezium-like shape; lay flat pouches made by heat sealing two flat films to one another, the pouch having an open top, a first side seal, a second side seal and a bottom seal.

As used herein, the term "lidding film" refers to a film that closes the opening of a rigid or semi-rigid container and/or encloses a product contained in a rigid or semi-rigid container.

As used herein, the phrases "corona treatment" and "corona discharge treatment" refer to subjecting one or both the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

As used herein, the term "orientation" refers to the "solid state orientation", namely to the process of stretching of the film carried out at a temperature higher than the Tg (glass transition temperatures) of all the resins making up the layers of the structure and lower than the temperature at which all the layers of the structure are in the molten state. The solid state orientation may be mono-axial, transverse or, preferably, longitudinal, or, preferably, bi-axial.

The phrase "orientation ratio in machine or longitudinal direction" refers to the number of times the film has been oriented in that direction in relation to its original size. For example, if a film has been oriented to three times its original size in the longitudinal direction, the orientation ratio in longitudinal direction is 3:1.

As used herein the phrases "heat-shrinkable," "heat-shrink," and the like, refer to the tendency of the solid-state oriented film to shrink upon the application of heat, such that the size of the film decreases while the film is in an unrestrained state.

As used herein, the phrase "longitudinal direction", refers to a direction "along the length" of the film, i.e., in the direction of the film as the film is formed during coextrusion.

As used herein, the phrase "transverse direction", refers to a direction across the film, perpendicular to the machine or longitudinal direction.

As used herein, the term "layer" refers to a single layer of the film, having a substantially homogenous polymeric composition within it.

DETAILED DESCRIPTION OF INVENTION

A first object of the present invention is a fully thermoplastic heat sealable, optionally oriented, multilayer polyester based film comprising at least the following layers:

1) a heat-sealable polyester based outer layer;
2) an inner layer placed between layer 1) and layer 3) comprising a major proportion of one or more polyesters and at least 1 wt %, with respect to the total weight of the layer, of one or more further polymers selected from the group consisting of polyolefins, ethylene vinyl acetate copolymers (EVA), ethylene (meth)acrylate/(meth)acrylic acid copolymers and mixtures thereof; and
3) a polyester based layer.

In the present film layer 2) preferably adheres to layer 1) and/or layer 3).

In one embodiment, layer 2) adheres to the heat-sealable layer 1).

In another embodiment, layer 2) adheres to layer 3).

In still another embodiment, layer 2) adheres to both the heat-sealable layer 1) and layer 3).

Preferably, the overall composition of the film of the invention comprises at least 75 wt %, preferably at least 85 wt %, even more preferably at least 90 wt % of polyesters. Preferably, said polyesters are polyesters of aromatic dicarboxylic acids, more preferably of terephthalic acid.

The film of the invention may have 3 or more layers, preferably between 3 and 10, more preferably between 3 and 6, even more preferably 3 or 4.

The total thickness of the film of the invention may vary within wide limits. It is preferably between 3 and 100 microns, preferably between 5 and 80 microns, more preferably between 8 and 70 microns, more preferably between 15 and 50 microns, more preferably between 20 and 40 microns, even more preferably between 25 and 35 microns.

Preferably, the heat sealable layer 1) has a thickness comprised between 0.5 and 15 microns, preferably between 1 and 10 microns, more preferably between 2 and 6 microns.

Preferably, layer 2) has a thickness comprised between 1 and 15 microns, preferably between 1 and 10 microns, more preferably between 2 and 6 microns, even more preferably between 2 and 4 microns.

Preferably, layer 3) has a thickness comprised between 5 and 60 microns, more preferably between 8 and 40 microns, more preferably between 10 and 20 microns, even more preferably between 12 and 18 microns.

Preferably, layer 3) has a thickness of at least 5 microns, more preferably of at least 8 microns, even more preferably of at least 10 or 12 microns.

In the present film, layer 3) has a thickness of at least 20%, more preferably of at least 40%%, even more preferably of at least 45% or 50% of the total thickness of the film.

The film according to the invention may be heat shrinkable or not, preferably it is heat shrinkable. A heat shrinkable film according to the invention has a percentage of free shrink at 120° C. of at least 1%, 5%, 10%, 15% in longitudinal and/or transverse direction, measured in oil according to ASTM D 2732.

When the film of the invention is oriented, it is preferably biaxially oriented, with an orientation ratio preferably comprised between about 2:1 and about 5:1, more preferably between 2:1 and about 4:1, even more preferably of 3.6:1 in both longitudinal and transverse direction.

In the film according to the invention, the inner layer 2) comprises a major proportion of one or more polyesters.

In an embodiment, layer 2) comprises at least 80 wt %, preferably at least 85 wt %, more preferably at least 90 wt %, even more preferably at least 95 wt % of one or more polyesters.

In a preferred embodiment, layer 2) consists of at least 1% of one or more polymers selected from the group consisting of polyolefins, ethylene vinyl acetate copolymers (EVA), ethylene (meth)acrylate/(meth)acrylic acid copolymers and mixtures thereof, the remainder being one or more polyesters (which can thus amount up to 99 wt %).

Preferably, said polyesters are polyesters of aromatic dicarboxylic acids, more preferably of terephthalic acid.

Poly(ethylene terephthalate) (PET) is a particularly preferred polyester. Preferably, said polyesters are copolyesters, more preferably poly(ethylene terephthalate) copolymers.

In an embodiment, layer 2) comprises only one polyester, preferably a copolyester. For example, such copolyester can be a poly(ethylene terephthalate) copolymer.

Alternatively, such polyester can be a glycol-modified poly(ethylene terephthalate) copolymer (PETG).

According to a preferred embodiment, layer 2) comprises a mixture of least two different polyesters, preferably copolyesters, more preferably poly(ethylene terephthalate) copolymers.

In a particularly preferred embodiment, layer 2) comprises a mixture of at least two polyesters, wherein at least one is a glycol-modified polyester. Even more preferably, layer 2) comprises a mixture of at least two poly(ethylene terephthalate) copolymers, wherein at least one is a glycol-modified poly(ethylene terephthalate) copolymer (PETG).

In an embodiment, the at least one glycol-modified poly(ethylene terephthalate) copolymer represents the major proportion of the total polyester mixture of layer 2). For example, the polyester mixture can comprise from 50 wt % to 75 wt %, preferably from 60 wt % to 70 wt % of one or more glycol-modified poly(ethylene terephthalate) copolymer (PETG).

For example, a suitable copolyester for use in layer 2) of the film of the invention is Ramapet N180 by Indorama. A suitable glycol-modified poly(ethylene terephthalate) copolymer (PETG) is for example GN001 by Eastman Chemical.

Further to the major proportion of one or more polyesters, layer 2) also comprises at least 1 wt % of one or more further polymers selected from polyolefins, ethylene vinyl acetate copolymers (EVA), ethylene (meth)acrylate/(meth)acrylic acid copolymers, and mixtures thereof.

Preferably, the total amount of said one or more further polymers is comprised between 1 wt % and 20 wt % with respect to the total weight of layer 2), preferably between 1 wt % and 10 wt %, more preferably between 1 wt % and 8 wt %, even more preferably between 2 wt % and 5 wt %.

In an embodiment, layer 2) comprises at least one polyolefin; said polyolefins can be selected from the group consisting of ethylene polymers, propylene polymers, butylene polymers, and mixtures thereof.

The ethylene polymers are preferably ethylene copolymers, more preferably are ethylene alpha olefin copolymers, even more preferably are ethylene ($C_4$-$C_{10}$) alpha olefin copolymers. In a particularly preferred embodiment, they are linear low density polyethylene (LLDPE).

The propylene polymers are preferably propylene copolymers, more preferably are propylene alpha olefin copolymers.

The butylene polymers are preferably butylene copolymers, more preferably are butylene alpha olefin copolymers.

In an embodiment, the polyolefins are modified polyolefins, preferably anhydride modified polyolefins, more preferably maleic anhydride modified polyolefins.

Within this embodiment, the modified polyolefins are preferably ethylene alpha olefin copolymers, more preferably ethylene ($C_4$-$C_{10}$) alpha olefin copolymers, even more preferably are LLDPE.

In a particularly preferred embodiment, the modified polyolefins are anhydride modified LLDPE, more preferably maleic anhydride modified LLDPE.

Particularly preferred polyolefins of layer 2) are selected from $C_4$-$C_{10}$ alpha olefin copolymers, preferably linear low density polyethylenes, more preferably anhydride modified linear low density polyethylenes, butylene copolymers and mixtures thereof.

Suitable polyolefins are the products commercialized under the tradenames Dowlex 2045S by Dow, or Polybutene-1 PB 8640M by LyondellBasel Industries.

Suitable maleic anhydride modified linear low density polyethylenes are for example ADMER NF927E, ADMER NF911E, ADMER NF912E or ADMER NF518E by Mitsui Chemical or Bynel 4104 by DuPont.

In an embodiment, layer 2) comprises at least one ethylene vinyl acetate copolymer (EVA): said EVA copolymers can be selected within ethylene/vinyl acetate/carbon monoxide copolymers, preferably with a comonomer content between 20 and 30 wt %, more preferably of 24%.

A suitable ethylene vinyl acetate copolymer for use in layer 2) of the invention is the product commercialized under the tradename Elavloy 741 by DuPont.

In an embodiment, layer 2) comprises at least one ethylene (meth)acrylate/(meth)acrylic acid copolymer.

Said ethylene (meth)acrylate copolymers can be selected from ethylene $C_1$-$C_4$ alkyl (meth)acrylate copolymers, preferably from ethylene methyl (meth)acrylate copolymers, ethylene ethyl (meth)acrylate copolymers and ethylene-butyl (meth)acrylate copolymers, more preferably they are ethylene methylacrylate copolymers.

Preferably said ethylene methylacrylate copolymer comprises between 5 and 40 wt %, preferably between 8 and 25 wt % methyl acrylate.

A suitable ethylene methylacrylate copolymer is for example Elvaloy 1820 AC or Elvaloy AC 1609 commercialized by DuPont, Lotryl Bestpeel 2012 or Lotryl XX1338 commercialized by Arkema.

In an embodiment, said ethylene (meth)acrylic acid copolymers may be in form of ionomers, preferably zinc ionomers.

In an embodiment, the ethylene (meth)acrylate/(meth) acrylic acid copolymers are modified ethylene (meth)acrylate/(meth)acrylic acid copolymers, preferably anhydride modified ethylene (meth)acrylate/(meth)acrylic acid copolymers. Preferably, said anhydride modified ethylene (meth)acrylate/(meth)acrylic acid copolymers are maleic anhydride modified ethylene (meth)acrylate/(meth)acrylic acid copolymers. Preferably, said anhydride modified ethylene (meth)acrylate/(meth)acrylic acid copolymers are anhydride modified ethylene methylacrylate copolymers, more preferably maleic anhydride ethylene methylacrylate copolymers.

A suitable anhydride modified ethylene methylacrylate copolymer is for example Bynel 21E533, Bynel 21E830 or Bynel CXA 21E787 by DuPont.

In an embodiment, layer 2) comprises between 1 wt % and 10 wt %, preferably between 1 wt % and 8 wt %, more preferably between 2 wt % and 5 wt % of a polyolefin, the remainder being one or more poly(ethylene terephthalate) copolymers, for example PET, or PETG, or a mixture of PET and PETG.

Within this embodiment, preferably, the polyolefins are ethylene alpha olefin copolymers, preferably linear low density polyethylenes (LLDPE), more preferably anhydride modified LLDPE, and the one or more poly(ethylene terephthalate) copolymers are PET, or PETG, or a mixture of PET and PETG.

In a particularly preferred embodiment, layer 2) consists of 2-5 wt % of LLDPE and 95-98 wt % of one or more poly(ethylene terephthalate) copolymers selected from PET, PETG and a mixture of PET and PETG.

In another particularly preferred embodiment, layer 2) consists of 2-5 wt % of anhydride modified LLDPE and 95-98 wt % of one or more poly(ethylene terephthalate) copolymers selected from PET, PETG and a mixture of PET and PETG. The anhydride modified LLDPE is preferably maleic anhydride modified LLDPE.

In another particularly preferred embodiment, layer 2) consists of 2-5 wt % of polybutylene and 95-98 wt % of one or more poly(ethylene terephthalate) copolymers selected from PET, PETG and a mixture of PET and PETG.

In an embodiment, layer 2) consists of between 2 wt % and 5% of ethylene methylacrylate and 95-98 wt % of one or more poly(ethylene terephthalate) copolymers selected from PET, PETG and a mixture of PET and PETG.

In another embodiment, layer 2) consists of between 2 wt % and 5% of anhydride modified ethylene methylacrylate, preferably maleic anhydride modified ethylene methylacrylate and 95-98 wt % of one or more poly(ethylene terephthalate) copolymers selected from PET, PETG and a mixture of PET and PETG.

In all the above embodiments, in the mixture of PET and PETG, the weight percentage of PETG is preferably higher than the weight percentage of PET.

In all the above embodiments, the thickness of layer 2) is preferably comprised between 2 and 10 microns, more preferably between 2 and 6 microns, even more preferably it is comprised between 2.5 and 3.5 or it is 3 microns.

In addition to the above composition, layer 2) may contain up to 5% of additional components, such as for example inorganic additive compounds.

In the film of the invention, the composition of the heat sealable layer 1) may be any polyester based composition known in the art suitable for obtaining a hermetic package when heat sealed to a polyester container. According to the invention, a hermetic package is obtained when the Dopack value for the package, measured as described in the experimental section, is at least 0.25, preferably at least 0.30, more preferably at least 0.35.

Preferably, the heat sealable layer 1) comprises at least 90 wt %, more preferably at least 95 wt %, more preferably at least 98 wt %, even more preferably 100 wt % of one or more polyesters.

Preferably, said polyesters are polyesters of aromatic dicarboxylic acids, more preferably of terephthalic acid.

Preferably, said polyesters are copolyesters, more preferably poly(ethylene terephthalate) copolymers.

Preferably, the heat-sealable layer 1) has a composition that provides a seal initiating temperature comprised between 110° C. and 170° C., more preferably between 110° C. and 150° C.

For example, suitable copolyesters for use in layer 1) of the film of the invention are Eastobond 19412, GN001 or Eastar 6763 C0235 by Eastman Chemical or Vitel 1916NSB-p by Eastman Chemical.

According to a particularly preferred embodiment, the heat-sealable layer 1) comprises at least two different polyesters, preferably copolyesters, having glass transition temperatures that differ of at least 15° C. More preferably, according to this embodiment, said heat-sealable layer composition comprises:

a) between 80 and 97 wt % of at least one polyester a), preferably a copolyester, more preferably a poly(ethylene terephthalate) copolymer, having a glass transition temperature T(g) between 40 and 60° C.;

b) between 3 and 20 wt % of at least one polyester b), preferably a copolyester, more preferably a poly(ethylene terephthalate) copolymer, having a glass transition temperature T(g) between 65 and 90° C.;

wherein polyester b) has a glass transition temperature at least 15° C. higher than the glass transition temperature of polyester a), and components a) and b) are present in the composition in a total amount of at least 90 wt %.

A suitable polyester a) according to this embodiment of the invention is for example Eastobond 19412, commercialized by Eastman Chemical. A suitable polyester b) according to this embodiment of the invention is for example the product GN001, commercialized by Eastman Chemical.

The film according to the invention comprises, opposite to the heat sealable layer 1), an outer layer, preferably comprising at least 90 wt %, preferably at least 95 wt %, more preferably at least 98 wt %, even more preferably 100 wt % of polyesters.

Preferably, said polyesters are polyesters of aromatic dicarboxylic acids, more preferably of terephthalic acid.

Preferably said polyesters comprise at least 80 wt % of (semi)crystalline polyesters, preferably consist of an amount between 90 wt % and 100 wt %, preferably between 95 wt % and 99 wt %, even more preferably 98 wt % of (semi) crystalline polyesters and an amount between 0 and 10 wt %, more preferably between 1 and 5 wt %, even more preferably 2 wt % of amorphous polyesters.

Preferably, said polyesters are copolyesters, more preferably poly(ethylene terephthalate) copolymers.

According to one preferred embodiment of the present invention, the film has only three layers and layer 3) of the film corresponds to the outer layer of the film (outer layer 3), preferably having the composition as described above.

According to an alternative preferred embodiment of the present invention, the film has more than 3 layers, more preferably 4 layers.

In a film according to this embodiment, the outer layer of the film is a further layer 4) of the film, which preferably adheres to layer 3) and which is preferably polyester based.

In a film according to this embodiment, layer 3) is an inner layer of the film (inner layer 3) and preferably comprises at least 90 wt %, preferably at least 95 wt %, more preferably at least 98 wt %, even more preferably 100 wt % of one or more polyesters.

Preferably, said polyesters are polyesters of aromatic dicarboxylic acids, more preferably of terephthalic acid.

Preferably, said polyesters consist of an amount between 50 wt % and 100 wt % of (semi)crystalline polyesters and an amount between 0 and 50 wt % of amorphous polyesters.

Preferably, said polyesters are copolyesters, more preferably poly(ethylene terephthalate) copolymers.

According to a particularly preferred embodiment, layer 3) comprises an amount of at least 50 wt %, more preferably between 50 and 80 wt %, even more preferably between 55 wt % and 70 wt %, even more preferably about 60 wt % of (semi)crystalline polyesters and an amount between 20 and 50 wt %, more preferably between 30 and 45 wt %, even more preferably of about 40 wt % of amorphous polyesters.

According to an alternative preferred embodiment, said polyesters contain 100% of amorphous polyesters.

A suitable amorphous copolyester for use in the inner layer 3) of the invention for example the product commercialized under the tradename GN001 by Eastman Chemical.

A suitable amorphous copolyester for use in the outer layer of the film of the invention is for example the product commercialized under the tradename Sukano G dc S503 by Sukano (which also comprises slip/antiblock additives).

A suitable (semi)crystalline polyester for use in inner layer 3) or in the outer layer of the film of the invention is for example the product commercialized under the tradename Ramapet N180 by Indorama.

In another embodiment, one or more further thermoplastic layer(s) are interposed between layer 2) and layer 3). Preferably, only one further layer is interposed between layer 2) and layer 3) and adheres to both layer 2) and layer 3). Such further layer(s) interposed between layer 2) and layer 3) are preferably polyester based layer(s), preferably comprising at least 90 wt %, preferably at least 95 wt %, more preferably at least 98 wt even more preferably 100 wt % of one or more polyesters.

Preferably, said polyesters are polyesters of aromatic dicarboxylic acids, more preferably of terephthalic acid.

Preferably, said polyesters are copolyesters, more preferably poly(ethylene terephthalate) copolymers.

The total thickness of said further layer(s) interposed between layer 2) and layer 3) is preferably lower than 5 microns, preferably comprised between 0.5 micron and 4.5 microns, more preferably between 1 micron and 3 microns.

Preferably, the total thickness of said further layer(s) interposed between layer 2) and layer 3) is lower than 20%, more preferably lower than 10%, even more preferably lower than 5% of the total thickness of the film.

In another embodiment, one or more further layer(s) are interposed between the heat sealable layer 1) and layer 2). Preferably, only one further layer is interposed between the heat sealable layer 1) and layer 2) and adheres to both layer 1) and layer 2). Such further layer(s) interposed between the heat sealable layer 1) and layer 2) are preferably polyester based layer(s), preferably comprising at least 90 wt %, preferably at least 95 wt %, more preferably at least 98 wt %, even more preferably 100 wt % of one or more polyesters.

Preferably, said polyesters are polyesters of aromatic dicarboxylic acids, more preferably of terephthalic acid.

Preferably, said polyesters are copolyesters, more preferably poly(ethylene terephthalate) copolymers.

The total thickness of said further layer(s) interposed between the heat sealable layer 1) and layer 2) is preferably lower than 5 microns, preferably comprised between 0.5 micron and 4.5 microns, more preferably between 1 micron and 3 microns.

Preferably, the total thickness of said further layer(s) interposed between layer 1) and layer 2) is lower than 20%, more preferably lower than 10%, even more preferably lower than 5% of the total thickness of the film.

Preferably, in order to improve the processing of the film in a high speed packaging equipment, slip and/or anti-blocking additives may be added to one or both of the heat sealable layer and the outer layer opposite the heat sealable layer. These additives may be added in the form of a concentrate in a polyester carrier resin. The amount of carrier is typically in the order of 0.1-5% of the total weight of the layer.

As will be demonstrated in the experimental section, the films according to the invention, both when used as lidding films sealed onto polyester containers and when used to form sealed flexible containers, show hermeticity and easy opening properties. Preferably, the lidding film opens from the container (or the seal(s) of the flexible container open(s)) by means of a cohesive failure mechanism occurring within the film without tearing and producing no or just few small fringes. In particular, the inventors have observed that the film of the invention, when subjected to pulling in order to open the package, shows cohesive failure preferably within the inner layer 2) of the film, followed by a breakage of the structure of the film which leads to the opening of the package.

The above opening mechanism is particularly advantageous when the composition of the films is such as to leave a visible white residue on the flange of the container, which serves as evidence of hermeticity and lack of tampering of food or medical product packages.

Furthermore, the film of the invention has good optical properties.

The film according to the first object of the present invention may be coextruded. In particular, the film may be manufactured by processes well known in the art such as flat or round co-extrusion, optionally followed by mono- or bi-orientation, performed by flat, sequential or simultaneous tenterframe orientation or by trapped bubble orientation on Double or Triple Bubble lines, respectively.

Preferably, coextrusion is carried out by means well known in the art, for example using a flat or a circular film die that allows shaping the polymer melt into a flat tape or a tubular tape (tube), respectively, wherein each of the blends of the different layers of the film are extruded simultaneously through the extrusion die.

The film of the present invention, co-extruded as described above, is, optionally oriented through a round or flat film orientation process that produces a monoaxially, preferably biaxially oriented film.

In details, in case the multilayer film is co-extruded through a circular extrusion die, the tube of molten polymers so obtained is quenched immediately after extrusion without being expanded, optionally cross-linked, then heated to a temperature which is above the Tg of all the resins employed and below the melting temperature of at least one of the resins employed, typically by passing it through a hot water bath or heating it with an IR oven or with hot air, and expanded, still at this temperature by internal air pressure to get the transverse orientation and by a differential speed of the pinch rolls which hold the thus obtained "trapped bubble" to provide the machine or longitudinal orientation. An example of equipment suitable for this technique is disclosed by U.S. Pat. No. 4,841,605.

Otherwise, when the multilayer film according to the present invention is obtained by flat coextrusion through a slot die, optional orientation can be performed by heating the flat tape to its softening temperature but below its melt temperature and by stretching in the solid state with a simultaneous or a sequential tenterframe process. The film is then rapidly cooled to somehow freeze the molecules of the film in their oriented state and wound. Furthermore, in some instances it may be desirable to submit the oriented structure to a controlled heating-cooling treatment, so-called annealing, that is aimed at having a better control on low temperature dimensional stability of the film.

In the case of oriented films, while orientation is typically carried out in both machine and transverse directions, mono-oriented films or films preferentially/exclusively oriented in one direction can be obtained by controlling/avoiding transverse or machine orientation.

Typical heat setting temperatures for the present films range from 120° C. to 220° C., preferably between 140° C. and 170° C., more preferably at 158° C.

The film according to the present invention can also optionally comprise an antifog agent coated onto at least the surface of the heat sealable layer 1) of the film, which is directly facing the product in the container, so as to obtain an antifogging surface. Suitable antifog agents for this application method can be selected from non-ionic surfactants such as polyhydric alcohol fatty acid esters, higher fatty acid amines, higher fatty acid amides, polyoxyethylene ethers of higher fatty alcohols and ethylene oxide adducts of higher fatty acid amines or amides. Preferred antifog agents are ethoxylated sorbitan derivatives with higher fatty acids such as those marketed under the trade name of Tweens or Polysorbates, preferably with fatty acids from C14 to C24, for example Atmer 116 commercialized by Croda.

The application of the antifog agent may be carried out either by an in-line method involving application during the manufacture or by an off-line method involving application after the manufacture of the film. The antifog agent may be applied to provide a final grammage in an amount of from about 30 mg/sqm to 140 mg/sqm, preferably from about 40 mg/sqm to 120 mg/sqm, more preferably from 50 mg/sqm to 100 mg/sqm.

The surface of the heat sealable layer of the film may be corona treated before applying the coating.

The coating composition may be applied to the film by any suitable conventional technique, well known in the art, such as for example digital printing, roller printing, flexography, slot die, rotogravure, vapour deposition, or by blade, brush or scraper, or by spraying or pouring.

In the case of oriented films, the antifog coating can be applied in-line to the coextruded tape.

In the simultaneous tenterframe process, the antifog coating can be applied in-line before orientation occurs. In this embodiment, the solvent of the antifog composition is allowed to evaporate in the simultaneous stretching oven. In the sequential tenterframe process, the antifog coating can be applied in-line on the longitudinally oriented flat tape after longitudinal direction orientation and before transversal direction orientation. In this embodiment, the solvent of the antifog composition is allowed to evaporate in the transversal direction orientation oven. A second object of the present invention is a package comprising a container, preferably a tray, a product placed into said container and a lid made of the film according to the first object of the present invention sealed onto said container, thus enclosing the product, wherein the heat sealing layer of the film is in contact with or faces the product. The container may be any container that forms a seal with the film of the invention. Typically, the surface of the container involved in the formation of the seal with the film of the invention comprises a polyester resin, preferably an amorphous polyester resin (APET). For example, containers can be made of cardboard coated with polyester or can be integrally made of a polyester resin. Examples of suitable polyester containers for the package of the invention are CPET, APET, APET/CPET and RPET containers.

The package is produced by techniques well known to those skilled in the art.

For example, once the food to be packaged has been introduced into the container, for example a tray, the film according to the invention is placed on the container such that the heat sealable surface is in contact with the surface of the rim or the peripheral lip/flange of the container and sealed to the container by means of temperature using conventional techniques and equipment. Sealing is carried out by means of a heated frame at temperatures preferably in the range from 100° C. to 210° C. or 100° C. to 180° C., preferably from 110° C. to 150° C. or 130° C. to 190° C., more preferably from 120° C. to 140° C. or 140° C. to 180° C., at a pressure of 2 to 10 bar, preferably 4 to 8 bar. Sealing times are typically in the order of 0.3 or 0.5 to 2.0 seconds, preferably of 0.5 to 1.0 or 1.0 to 1.5 seconds.

For example, the container with the product loaded therein is brought into a lid sealing station, which comprises a lower chamber and an upper chamber, and a web of the film of the invention is provided over the top of the container. The lower chamber and the upper chamber are then closed together, the air in-between the support and the lidding film is replaced by the suitable gas or gas admixture, with or without prior air evacuation, and then the lidding film of the invention is sealed to the rim or the peripheral lip of the container by means of the combination of a heated frame or platen above the lidding film and a similarly framed anvil supporting the container rim or peripheral lip, that are pressed together. The lidding film is cut almost at the same time as the lid is sealed and, in case of shrinkable lids, shrinkage of the lid in the package typically occurs at the same time as the heat of the sealing elements in the lidding station is sufficient to get the desired shrinkage. Lidding machines that can be suitable for tray lidding process include for instance Proseal GTO Tooling 1218 OC, Multivac 400 and Multivac T550 by Multivac Sep. GmbH, Mondini Trave, E380, E390 or E590 by Mondini S. p. A., Ross A20 or Ross S45 by Ross-Reiser, Mecaplastic 1000, Meca-2002 or Meca-2003 by Mecaplastic, the tray lidding machines of Sealpac and the like machines.

In one embodiment, the film of the present invention can be laminated onto a support layer. In a preferred embodiment, the support layer is a film made of PET, preferably biaxially oriented PET (BOPET). Preferably, such support layer can be a high barrier film; suitable high barrier films to be employed as support layers for laminating the film of the invention are AlOx or SiOx coated BOPET films.

An example of an AlOx coated BOPET film is the one marketed by Toppan under the tradename GL-ARH.

An example of SiOx coated BOPET film is the one marketed by Mitsubishi Plastics under the tradename Techbarrier TX.

Laminating the film of the invention on high barrier films, in particular on AlOx or SiOx coated BOPET films provides for a resulting packaging film with high sustainability and excellent barrier properties, which grants a shelf life of more than ten days to packaged food products. Such packaging film is thus particularly suitable for packaging perishable, high-value food, such as fresh and smoked or processed meat.

The laminated film according to this embodiment of the invention can be used for example as lidding film to be sealed on rigid or semi-rigid containers or for manufacturing flexible containers such as bags or pouches.

In another embodiment, the film of the present invention can be used as a liner film for rigid or semi-rigid containers such as trays, bowls, dishes, boxes, cups.

For example, the film of the invention can be applied as a liner to a support layer suitable for thermoforming and the resulting sheet can be thermoformed to manufacture rigid or semi-rigid containers. A suitable support can be for example a PET sheet.

Alternatively, the film of the invention can be applied as a liner to pre-formed rigid or semi-rigid containers.

Thermoforming is well known in the art, for example, it is described in Modern Plastic Encyclopedia, 1984-1985, at pages 329-336.

In thermoforming, in general, a flat sheet is heated until the thermoplastic material is sufficiently softened and then placed over a mould, typically made of aluminum. The heated sheet is then forced towards the surface of the mould by vacuum, air pressure and/or direct mechanical force, so that it assumes the shape of the mould. The sheet is then cooled while being held against the mould and thus originates a thermoformed shaped product which is ejected from the mould.

In the thermoformed container according to this embodiment, the heat-sealable layer of the film of the invention forms the surface of the container which will come into contact or face the supported product.

Accordingly, a package can be manufactured which comprises a thermoformed container according to the above embodiment, a product placed into or onto such container and a lid, which is hermetically sealed all around onto said container, thus enclosing the product. The lid can preferably have a polyester sealant layer which is sealed onto the container, more preferably it is a film according to the invention.

When the film of the invention is laminated onto a support layer or applied as a liner to a pre-formed container or to a support layer suitable for thermoforming, it preferably has a total thickness in the range between 3 and 25 microns, more preferably between 5 and 20 microns, even more preferably between 8 and 18 microns.

In particular, the heat sealable layer 1) has a thickness preferably comprised between 0.5 and 8 microns, more preferably between 2 and 4 microns.

Layer 2) has a thickness preferably comprised between 1 and 8 microns, more preferably between 2 and 6 microns, even more preferably between 2 and 4 microns.

Layer 3) has a thickness preferably comprised between 2 and 20 microns, more preferably between 8 and 18 microns, more preferably between 10 and 16 microns.

As will be demonstrated in the experimental section, the films of the present invention have the advantage that they allow to obtain a hermetically sealed package that it is easy to open.

The package is particularly suitable to be used for packaging moist or respiring products such as fruits and vegetables and cheese, or for packaging fresh meat, in particular red meat, or for packaging "ready meals", in particular meat-based ready meals. The package is also suitable to be used for the so-called overfilled packages, wherein the packaged product protrudes over the upper margin of the container; this package is quite common for products like, e.g., olives. The package is also suitable for packaging medical products.

A third object of the present invention is the use of the film according to the first object of the invention for packaging food, preferably moist or respiring products such as fruit and vegetables or cheese, or fresh meat, in particular red meat, or ready meals to be cooked either in microwave oven or in conventional oven, or in overfilled packaging, or for packaging medical products.

A fourth object of the present invention is a flexible container obtainable by heat-sealing a film according to the first object of the invention on itself or by heat sealing two films, of which at least one is a film according to the first object of the invention.

In particular, the flexible container is obtainable by forming a heat seal between the sealant layer(s) of the film(s), or by forming a heat seal between the sealant layer and the outer layer opposite the sealant layer of the film, or by forming a heat seal between the outer layer(s) opposite the sealant layer of the film(s).

Preferably, in the flexible container of the invention the sealant layer of the film(s) faces the inside of the container. Accordingly, the heat seals are formed either between the sealant layer(s) of the film(s), or between the sealant layer and the outer layer opposite the sealant layer of the film. Seals of the first type are generally referred to as "fin seals" or "in/in seals" (where "in" indicates the sealant layer of the film); seals of the second type are generally referred to as "lap seals" or "in/out seals" (where "out" indicates the outer layer of the film, opposite the sealant layer).

Preferably, the flexible container is in the form of a bag or a pouch.

As will be shown in Example 6 of the experimental section, for pouches made with the film of the invention, in/in sealing is preferably performed at temperatures comprised between about 110° C. and about 190° C., more preferably between about 110° C. and about 160° C.; in/out sealing is preferably performed at temperatures comprised between about 140° C. and 200° C., more preferably between about 150° C. and 190° C. These temperature ranges allow to obtain good hermeticity of the seals and, at the same time, an easy opening behaviour upon opening the pouch.

Pouches made with the film of the invention and having an in/in seal show an opening force (measured according to the test method described in Example 6 of the experimental section) preferably comprised between 750 g/inch and 3000 g/inch, more preferably comprised between 850 g/inch and 1500 g/inch.

Pouches made with the film of the invention and having an in/out seal show an opening force (measured according to the test method described in Example 6 of the experimental section) preferably comprised between 500 g/inch and 2400 g/inch, more preferably comprised between 800 g/inch and 1800 g/inch.

Any conventional method for making bags and pouches known in the art may be readily adapted to make flexible containers from the film according to the present invention.

For instance, a flexible container can be made on form-fill-seal machines such as a Horizontal Form-Fill-Seal (HFFS) or a Vertical Form-Fill-Seal (VFFS) machines.

A Horizontal Form-Fill-Seal (HFFS) machine performs a so-called flowpack packaging method. In details, such method conventionally comprises:

- a) providing the film according to the present invention,
- b) running the film through a former thus forming a tube,
- c) inserting a product, optionally placed in a rigid or semi-rigid container, into the tube,
- d) sealing the tube longitudinally,
- e) sealing and cutting the tube transversally at the beginning and at the end of the package, optionally gas-flushing or vacuumizing the tube before closing it, and
- f) optionally, heat shrinking the package.

In a flowpack packaging method the product, optionally in a rigid or semi-rigid container like a tray, is wrapped into an envelope made from a film of the present invention, preferably under a suitable and predetermined atmosphere. To create the envelope, the flat film is first folded around a former and longitudinally sealed to form a tube. The product, or the container containing the product is placed in such a tube where the leading edge has been closed and gas flushed with the suitably selected gas or gas mixture. The excess gas is generally removed by a gentle pressure on top of the package and the open end of the envelope is then sealed and the package separated from the tubing. In case of a shrinkable film, the loose package is then passed into a shrink tunnel, typically a hot air one set at a temperature suitable for shrinking such as a temperature of 100-150° C., to get shrinkage of the film and thus a tight package.

As an alternative, pouches can be made with a Vertical Form Fill Seal (VFFS) packaging system that has proven to be very useful in packaging a wide variety of flowable products. The VFFS process is known to those skilled in the art and described for instance in U.S. Pat. No. 4,589,247. A flowable product is introduced through a central, vertical fill tube to a formed tubular film of the invention which has been sealed transversely at its lower end, and longitudinally. The pouch is then completed by sealing the upper end of the tubular segment, and severing the pouch from the tubular film above it.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube for soft, fluid or powder products in case of a VFFS machine, and a transverse sealer for sealing the tubular film in a cross-wise direction to separate the products into discrete packages. Suitable machines for the flowpack process include Ilapak Delta 2000 and 3000 or Ulma Baltic, Artic or Pacific. Accordingly, a fifth object of the present invention is a package comprising the flexible container according to the fourth object described above and a product placed into said flexible container; optionally, the product can further be placed in a rigid or semi-rigid container such as a tray or a cup. Such a package can be manufactured for example through an FFS machine, preferably a Horizontal Form-Fill-Seal machine.

EXAMPLES

The present invention can be further understood by reference to the following examples that are merely illustrative and are not to be interpreted as a limitation to the scope of the claims.

Example 1—Preparation of Films

In the following films, the polymers and compositions indicated in Table 1 below were used.

TABLE 1

Polymers and compositions

| TRADENAME | SUPPLIER | ACRONYM |
|---|---|---|
| Eastobond 19412 | Eastman Chemical | PET1 |
| RAMAPET N180 | Indorama | PET2 |
| GN001 | Eastman Chemical | PETG1 |
| SUKANO G dc S503 | Sukano | PETG2(slip) |
| DOWLEX 2045S | DOW | LLDPE |
| ADMER NF927E | Mitsui Chemical | LLDPE-md1 |
| BYNEL 4104 | DuPont | LLDPE-md2 |
| Elvaloy 1820 AC | DuPont | EMA |
| BYNEL CXA 21E787 | DuPont | EMA-md |
| Polybutene-1 PB 8640M | LyondellBasell Industries | PB |
| VERSIFY 3000 | DOW | EPC |
| OREVAC 18211 | Arkema | EVA-md |
| ATMER 116 | Croda | Antifog Additive |
| ETHYL ACETATE | Rabbi solved | EtAc |

PET1: Polyester, copolymer of polyethylene terephthalate-Density 1.33 g/cc, Viscosity Intrinsic 0.74 dl/g;
PET2: Polyester, copolymer of terephthalic acid, isophthalic acid and mono-ethylene glycol, Density 1.4 g/cc, Glass Transition 78° C., Melting point 245° C., Viscosity Solution 0.80 mPa.sec;
PETG1: Polyethylene Terephthalate/Glycol-Density 1.27 g/cc, Glass Transition 78° C., Viscosity Intrinsic 0.75 dl/g;
PETG2(slip): AntiBlock and Slip in Polyethylene Terephthalate/Glycol, Amorphous Silica and Wax, Density 1.4 g/cc, Vicat softening point 82° C.;
LLDPE: Polyethylene, Linear Low Density Ethylene/Octene Copolymer (linear, Ziegler/Natta)-Density 0.9200 g/cc, Melt Flow Rate (190° C./02.16 kg). 1.00 g/10 min, Melting point 124.0° C., Vicat softening point 103° C.;
LLDPE-md1: Maleic anhydride grafted polyethylene, Density 0.915 g/cc, Melt Flow Rate (190° C./02.16 kg) 1.3 g/10 min, Vicat softening point 72° C.;
LLDPE-md2: anhydride-modified, linear low-density polyethylene-Density 0.9300 g/cc, Melt Flow Rate (190° C./02.16 kg) 1.10 g/10 min, Melting point 125.0° C., Vicat softening point 110° C.;
EMA: Copolymer of ethylene and methyl acrylate with 20% methyl acrylate comonomer content, Density 0.942 g/cc, Melt Flow Rate (190° C./02.16 kg) 8 g/10 min, Melting Point 92° C., Vicat Softening Point 54° C.;
EMA-md: Copolymer of ethylene and methyl acrylate, anhydride modified-Density 0.930 g/cc, Melt Flow Rate (190° C./02.16 kg) 1.6 g/10 min, Melting point 92° C., Vicat softening point 52° C.;
PB: Polybutene-Density 0.906 g/cc, Melt Flow Rate (200° C./02.16 kg) 10.0 g/10 min, Melt Flow Rate (190° C./02.16 kg) 1 g/10 min, Melting point 97° C.;
EPC: Copolymer of ethylene and propylene-Comonomer (ethylene) content 5.2%, Density 0.891 g/cc, Melt Flow Rate (230° C./02.16 kg) 8.0 g/10 min, Melting point 108° C., Vicat softening point 105° C.;
EVA-md: Maleic anhydride modified ethylene vinyl acetate copolymer-Density 0.95 g/cc, Melt Flow Rate (190° C./02.16 kg) 3.5 g/10 min, Melting point 72° C.;
Antifog additive: Ethoxylated Sorbitan Fatty acid ester-Polysorbate 80- Acid Number Max 2 mg KOH/g, Density Min 1.06 Max 1.08 g/cc, Viscosity Min 375 max 480 mPa.sec;
EtAc: Ethyl acetate: Boiling Point Range 76.5° C., Density 0.9 g/cc, Volatile Content 99.998%.

Films 1-13 and comparative film C1 having the structure and composition set out in Table 2 were prepared (all percentages are expressed by weight).

TABLE 2

Examples and comparative Example

| Film n. | Layer | Layer composition | Layer thickness (microns) | Film thickness (microns) |
|---|---|---|---|---|
| 1 | 1 | 90% PET1 10% PETG1 | 2.5 | 27 |
| | 2 | 64% PETG1 28% PET2 8% LLDPE-md2 | 3 | |
| | 3 | 60% PET2 40% PETG1 | 16 | |
| | 4 | 98% PET2 2% PETG2(slip) | 5.5 | |
| 2 | 1 | 90% PET1 10% PETG1 | 2.5 | 27 |
| | 2 | 66% PETG1 29% PET2 5% LLDPE-md2 | 3 | |
| | 3 | 60% PET2 40% PETG1 | 16 | |
| | 4 | 98% PET2 2% PETG2(slip) | 5.5 | |
| 3 | 1 | 90% PET1 10% PETG1 | 2.5 | 27 |
| | 2 | 68% PETG1 30% PET2 2% LLDPE-md2 | 3 | |
| | 3 | 60% PET2 40% PETG1 | 16 | |
| | 4 | 98% PET2 2% PETG2(slip) | 5.5 | |
| 4 | 1 | 90% PET1 10% PETG1 | 2.5 | 27 |
| | 2 | 68% PETG1 31% PET2 1% LLDPE-md2 | 3 | |
| | 3 | 60% PET2 40% PETG1 | 16 | |
| | 4 | 98% PET2 2% PETG2(slip) | 5.5 | |
| 5 | 1 | 90% PET1 10% PETG1 | 2.5 | 35 |
| | 2 | 68% PETG1 31% PET2 1% LLDPE-md2 | 3 | |
| | 3 | 60% PET2 40% PETG1 | 19 | |
| | 4 | 98% PET2 2% PETG2(slip) | 10.5 | |
| 6 | 1 | 90% PET1 10% PETG1 | 2.5 | 27 |
| | 2 | 66% PETG1 29% PET2 5% LLDPE-md1 | 3 | |
| | 3 | 60% PET2 40% PETG1 | 16 | |
| | 4 | 98% PET2 2% PETG2(slip) | 5.5 | |
| 7 | 1 | 90% PET1 10% PETG1 | 2.5 | 27 |
| | 2 | 66% PETG1 29% PET2 5% LLDPE | 3 | |
| | 3 | 60% PET2 40% PETG1 | 16 | |
| | 4 | 98% PET2 2% PETG2(slip) | 5.5 | |
| 8 | 1 | 90% PET1 10% PETG1 | 2.5 | 27 |
| | 2 | 66% PETG1 29% PET2 5% EMA | 3 | |
| | 3 | 60% PET2 40% PETG1 | 16 | |
| | 4 | 98% PET2 2% PETG2(slip) | 5.5 | |

21

TABLE 2-continued

22

TABLE 2-continued

| | | Examples and comparative Example | | |
|---|---|---|---|---|
| Film n. | Layer | Layer composition | Layer thickness (microns) | Film thickness (microns) |
| 9 | 1 | 90% PET1 / 10% PETG1 | 2.5 | 27 |
| | 2 | 66% PETG1 / 29% PET2 / 5% EMA-md | 3 | |
| | 3 | 60% PET2 / 40% PETG1 | 16 | |
| | 4 | 98% PET2 / 2% PETG2(slip) | 5.5 | |
| 10 | 1 | 90% PET1 / 10% PETG1 | 2.5 | 27 |
| | 2 | 66% PETG1 / 29% PET2 / 5% PB | 3 | |
| | 3 | 60% PET2 / 40% PETG1 | 16 | |
| | 4 | 98% PET2 / 2% PETG2(slip) | 5.5 | |
| 11 | 1 | 90% PET1 / 10% PETG1 | 2.5 | 35 |
| | 2 | 68% PETG1 / 30% PET2 / 2% LLDPE-md2 | 3 | |
| | 3 | 60% PET2 / 40% PETG1 | 19 | |
| | 4 | 98% PET2 / 2% PETG2(slip) | 10.5 | |
| 12 | 1 | 90% PET1 / 10% PETG1 | 5 | 27 |
| | 2 | 64% PETG1 / 26% PET2 / 10% LLDPE-md2 | 6 | |
| | 3 | 60% PET2 / 40% PETG1 | 13 | |
| | 4 | 98% PET2 / 2% PETG2(slip) | 3 | |
| 13 | 1 | 90% PET1 / 10% PETG1 | 2.5 | 27 |
| | 2 | 66% PETG1 / 29% PET2 / 5% LLDPE-md2 | 8 | |
| | 3 | 60% PET2 / 40% PETG1 | 12.5 | |
| | 4 | 98% PET2 / 2% PETG2(slip) | 4 | |
| 14 | 1 | 90% PET1 / 10% PETG1 | 2.5 | 35 |
| | 2 | 70% PET2 / 28% PETG1 / 2% LLDPE-md2 | 2.5 | |
| | 3 | 60% PET2 / 40% PETG1 | 20 | |
| | 4 | 98% PET2 / 2% PETG2(slip) | 10 | |
| 15 | 1 | 90% PET1 / 10% PETG1 | 2.5 | 35 |
| | 2 | 80% PET2 / 18% PETG1 / 2% LLDPE-md2 | 2.5 | |
| | 3 | 90% PET2 / 10% PETG1 | 20 | |
| | 4 | 99% PET2 / 2% PETG2(slip) | 10 | |
| 16 | 1 | 90% PET1 / 10% PETG1 | 2.5 | 35 |
| | 2 | 98% PETG1 / 2% LLDPE-md2 | 2.5 | |
| | 3 | 60% PET2 / 40% PETG1 | 20 | |
| | 4 | 98% PET2 / 2% PETG2(slip) | 10 | |
| 17 | 1 | 90% PET1 / 10% PETG1 | 2.5 | 35 |
| | 2 | 98% PET2 / 2% LLDPE-md2 | 2.5 | |
| | 3 | 60% PET2 / 40% PETG1 | 20 | |
| | 4 | 98% PET2 / 2% PETG2(slip) | 10 | |
| 18 | 1 | 90% PET1 / 10% PETG1 | 3 | 27 |
| | 2 | 68% PETG1 / 30% PET2 / 2% EPC | 2.5 | |
| | 3 | 60% PET2 / 40% PETG1 | 16.5 | |
| | 4 | 98% PET2 / 2% PETG2(slip) | 5 | |
| 19 | 1 | 90% PET1 / 10% PETG1 | 2.5 | 35 |
| | 2 | 68% PETG1 / 30% PET2 / 2% EVA-md | 2.5 | |
| | 3 | 60% PET2 / 40% PETG1 | 20 | |
| | 4 | 98% PET2 / 2% PETG2(slip) | 10 | |
| 20 | 1 | 90% PET1 / 10% PETG1 | 3.5 | 35 |
| | 2 | 66% PETG1 / 29% PET2 / 5% LLDPE-md2 | 3.5 | |
| | 3 | 60% PET2 / 40% PETG1 | 18 | |
| | 4 | 98% PET2 / 2% PETG2(slip) | 10 | |
| 21 | 1 | 90% PET1 / 10% PETG1 | 3.5 | 35 |
| | 2 | 61% PETG1 / 24% PET2 / 15% LLDPE-md2 | 3.5 | |
| | 3 | 60% PET2 / 40% PETG1 | 18 | |
| | 4 | 98% PET2 / 2% PETG2(slip) | 10 | |
| C1 | 1 | 90% PET1 / 10% PETG1 | 2.5 | 27 |
| | 2 | 31% PET2 / 69% PETG1 | 6 | |
| | 3 | 60% PET2 / 40% PETG1 | 13 | |
| | 4 | 98% PET2 / 2% PETG2(slip) | 5.5 | |

All the films were manufactured through a flat coextrusion process followed by in-line simultaneous Tenterframe orientation. Main operating conditions used to stretch and heat-set the films are:

MD ratio: 3.6:1;

TD ratio: 3.6:1;

Pre-heating temperature: 98° C.;

Stretching Temperature: 98° C.;

Heat-setting Temperature: 158° C.

The films so obtained were cooled down first by an air flow at 30° C. and then by passing onto a cooling roll that was cooled with water and kept at 20° C.

Example 2—Coating of Films

The sealant surface of three films of the invention (namely, film 3, film 11 and film 20) was coated using a DCM coater with a composition having the following composition:

4.20% Antifog additive (see Table 1)

17.90% ethyl acetate 77.90% water.

The Coating Line was Set-Up as Follows:

Line speed: 150 m/min

Engraved roll: 300 lines/cm

Drying temperature: 70-80° C.

The coated films were cooled down, before being wound up, by passing onto a roll that was cooled with water and kept at 20° C.

The coating grammage obtained for all the films was 50 mg/sqm.

Example 3—Characterization of Films: Clarity, Haze and Gloss

Clarity and haze of the films of table 2 have been evaluated according to the standard test method ASTM D1003. The gloss of the films of table 2 has been evaluated according to the standard test method ASTM D-2457 (gloss angle 60°). The results of the test are reported in Table 3 below.

TABLE 3

Clarity, Haze and Gloss values of films

| Film No. | Clarity (%) | Haze (%) | Gloss (g.u.) |
|---|---|---|---|
| 1 | 88.7 | 6.7 | 116 |
| 2 | 94 | 5 | 124 |
| 3 | 98.5 | 2.5 | 138 |
| 4 | 99.5 | 1.2 | 170 |
| 5 | 99.5 | 1 | 166 |
| 6 | 96 | 4.1 | 128 |
| 7 | 82 | 6.1 | 111 |
| 8 | 99 | 1.8 | 166 |
| 9 | 98 | 1.7 | 159 |
| 10 | 92.4 | 2.5 | 143 |
| 11 | 98.6 | 1.8 | 166 |
| 12 | 90.6 | 3.4 | 133 |
| 13 | 94 | 7 | n.d. |
| 14 | 99.4 | 1.6 | 167 |
| 15 | 98.9 | 2 | 168 |
| 16 | 91.3 | 2.1 | 143 |
| 17 | 99.2 | 1.5 | 165 |
| 18 | 98.9 | 1.8 | 165 |
| 19 | 99.9 | 1.5 | 169 |
| 20 | 94.5 | 2.9 | 142 |
| 21 | 76.9 | 5.6 | 131 |
| C1 | 99.7 | 1 | 160 | n.d. means not determined.

As can be seen from the data above, all films according to the invention show satisfactory to excellent optics.

Example 4—Characterization of Films in Sealed Trays Under Non-Contaminated Conditions The films of the invention and the comparative film C1 were sealed onto R-PET trays as will be described below.

The seals were clean, i.e. the films were sealed onto the tray keeping the tray flange under clean (i.e. non contaminated) conditions and no product was packaged.

The films of the invention and comparative film C1 were sealed onto R-PET Faerch Infia K37 trays (length=184 mm, width=117 mm, height=40 mm), using a Proseal GTO Tooling 1218 OC heat sealing machine, equipped with rounded sealing bar (w=5 mm; r=10 mm) and insulator plate peek type. Sealing time was 1 second. The sealing temperatures were 130° C., 140° C., 150° C., 210° C.

Opening of the packages obtained was evaluated according to the test method described below.

Opening of the Packages

The opening of the packages was manually tested by 2 panelists on at least 10 packs each.

The quality of the opening was recorded and average outcome of the test evaluated and classified, according to the parameters indicated below.

+ visible white residue on the flange of the tray; some small fringes;

++ visible white residue on the flange of the tray; few small fringes;

+++ visible white residue on the flange of the tray; no fringes;

* sharding upon opening (the film tears and parts thereof remain on the flange of the tray).

The presence of a visible white residue on the flange of the tray means that a part of the lidding film, comprising the sealant layer of the film, has remained attached to the container: this is an advantageous feature as it is evidence of the hermeticity and lack of tampering of the packaged products.

Where the small fringes are present, they are observed only in restricted areas of the packages. The little number and small extension of the fringes allowed however to obtain a uniform opening of the packages. The following table 4 reports the outcome of the opening of the packages.

TABLE 4

Quality of the opening of the Films sealed to R-PET Faerch Infia K37 trays

| Film No. | Seal at 130° C. | Seal at 140° C. | Seal at 150° C. | Seal at 210° C. |
|---|---|---|---|---|
| 1 | +++ | n.d. | n.d. | n.d. |
| 2 | +++ | +++ | +++ | * |
| 3 | +++ | n.d. | n.d. | * |
| 4 | ++ | n.d. | n.d. | * |
| 5 | +++ | n.d. | n.d. | * |
| 6 | +++ | n.d. | n.d. | n.d. |
| 7 | ++ | n.d. | n.d. | n.d. |
| 8 | + | n.d. | n.d. | n.d. |
| 9 | + | n.d. | n.d. | n.d. |
| 10 | ++ | n.d. | n.d. | n.d. |
| 11 | +++ | +++ | +++ | * |
| 12 | + | n.d. | n.d. | n.d. |
| 13 | + | n.d. | n.d. | * |
| 14 | +++ | n.d. | +++ | +++ |
| 15 | +++ | n.d. | +++ | +++ |
| 16 | + | n.d. | + | * |
| 17 | + | n.d. | ++ | +++ |
| 18 | n.d. | +++ | n.d. | n.d. |
| 19 | n.d. | ++ | n.d. | n.d. |
| 20 | +++ | +++ | +++ | n.d. |
| 21 | + | n.d. | n.d. | n.d. |
| C1 | Impossible to open the package | Impossible to open the package | Impossible to open the package | Impossible to open the package | n.d. means not determined.

As can be seen from the results above, the packages obtained with all the films of the invention show good to very good easy opening features.

In particular, it is noted that films with a high PET content in layer 2) (namely, films of examples 14, 15 and 17, having a PET content in layer 2) of 70 wt %, 80 wt % and 98 wt %,

25 respectively) maintain an easy opening behaviour even after being sealed to the container at temperatures of up to 210° C. Sealing at such high temperatures may be necessary to obtain good hermeticity of the seal even in contamination conditions.

Example 5—Characterization of Films in Sealed Trays Under Contaminated Conditions Some films of the invention were sealed at different sealing temperatures, as will be described below. The films were sealed onto clean tray flanges (no contamination) or on tray flanges contaminated by beef blood (to simulate fresh red meat packaging) or contaminated by oil (to simulate olives overfilled packages or ready meals).

Contamination conditions were realized by applying either beef blood or sunflower oil on the four corners of the tray flange using a pad soaked with beef blood or with sunflower oil, respectively, before the sealing step. Hermeticity of the packages obtained was evaluated according to the test method described below.

Hermeticity Test

The packages obtained were put in a closed water tank. Vacuum was created in the headspace of the water tank and recording was taken of the value of the pressure (in bars) inside the tank when bubbles start to escape from the closed packages. Twenty packages were tested for each sealing condition and the average pressure value was calculated, corresponding to the Dopack value for that package.

The packages were considered to provide a hermetic seal fit for use when they had a Dopack value higher than 0.25. Packages with a Dopack value equal or lower to 0.25 were considered as not providing any hermetic seal. The above films were tested on APET trays, which are particularly used in the packaging of fresh meat packages, in ready meals packages and in overfilled packages.

The above films were sealed onto a Silver Plastic APET 1826 tray, using a Sealpac A7 machine with a 1826 OC (Outside Cut) tool, equipped with a rounded seal bar (w=4 mm; r=8 mm), at the different sealing temperatures reported in table 5 below. Sealing time was 1 second.

Hermeticity was evaluated as described above (Dopack values). The results are reported in table 5 below.

TABLE 5

Films sealed to Silver Plastic APET 1826 trays

| Film | 110° C. | 120° C. | 130° C. | 140° C. | 150° C. | 170° C. | 180° C. |
|---|---|---|---|---|---|---|---|
| 2 | No contamination | | | | | | |
| | n.d. | n.d. | n.d. | 0.37 | n.d. | 0.38 | n.d. |
| | Oil contamination on the four corners of the tray | | | | | | |
| | n.d. | n.d. | n.d. | 0.33 | n.d. | 0.35 | n.d. |
| 3 | No contamination | | | | | | |
| | No seal | 0.19 | 0.35 | n.d. | 0.40 | n.d. | 0.42 |
| | Oil contamination on the four corners of the tray | | | | | | |
| | n.d. | n.d. | n.d. | n.d. | 0.39 | 0.41 | n.d. |
| | Beef blood contamination | | | | | | |
| | n.d. | n.d. | n.d. | n.d. | n.d. | 0.37 | 0.39 |
| 11 | No contamination | | | | | | |
| | n.d. | n.d. | n.d. | 0.34 | n.d. | 0.38 | n.d. |
| | Oil contamination on the four corners of the tray | | | | | | |
| | n.d. | n.d. | n.d. | 0.32 | n.d. | 0.35 | n.d. |
| | Beef blood contamination | | | | | | |
| | | | | | | 0.36 | 0.39 |

26

TABLE 5-continued

Films sealed to Silver Plastic APET 1826 trays

| Film | 110° C. | 120° C. | 130° C. | 140° C. | 150° C. | 170° C. | 180° C. |
|---|---|---|---|---|---|---|---|
| 14 | No contamination | | | | | | |
| | n.d. | n.d. | n.d. | 0.34 | n.d. | 0.35 | n.d. |
| | Oil contamination on the four corners of the tray | | | | | | |
| | n.d. | n.d. | n.d. | 0.29 | n.d. | 0.32 | n.d. |
| | Beef blood contamination | | | | | | |
| | n.d. | n.d. | n.d. | n.d. | n.d. | 0.34 | n.d. |
| 15 | No contamination | | | | | | |
| | n.d. | n.d. | n.d. | 0.37 | n.d. | 0.38 | n.d. |
| | Oil contamination on the four corners of the tray | | | | | | |
| | n.d. | n.d. | n.d. | 0.33 | n.d. | 0.36 | n.d. |
| | Beef blood contamination | | | | | | |
| 17 | n.d. | n.d. | n.d. | n.d. | n.d. | 0.32 | n.d. |
| | No contamination | | | | | | |
| | n.d. | n.d. | n.d. | 0.32 | n.d. | 0.36 | n.d. |
| | Oil contamination on the four corners of the tray | | | | | | |
| | n.d. | n.d. | n.d. | 0.30 | n.d. | 0.34 | n.d. |
| | Beef blood contamination | | | | | | |
| 18 | n.d. | n.d. | n.d. | n.d. | n.d. | 0.34 | n.d. |
| | No contamination | | | | | | |
| | n.d. | n.d. | n.d. | 0.34 | n.d. | 0.36 | n.d. |
| | Oil contamination on the four corners of the tray | | | | | | |
| | n.d. | n.d. | n.d. | 0.30 | n.d. | 0.33 | n.d. |
| 20 | No contamination | | | | | | |
| | n.d. | n.d. | n.d. | 0.38 | n.d. | 0.39 | n.d. |
| | Oil contamination on the four corners of the tray | | | | | | |
| | n.d. | n.d. | n.d. | 0.33 | n.d. | 0.36 | n.d. |
| 21 | No contamination | | | | | | |
| | | | | 0.34 | | | | n.d. means not determined.

The films above according to the invention show good hermeticity and sealability even under blood contamination conditions or oil contamination conditions, and despite the presence of an antifog coating on their sealant surface (films 3, 11 and 20). In addition, opening of the packages was manually tested as described in Example 4 above: easy opening was observed for all packages.

Example 6—Opening Force (Seal Strength) of the Films of the Invention

The following internal standard procedure was used for the evaluation of the force required to open the seals formed between two films of the invention.

Specimens having dimensions of 2.54 cm (1 inch) of width and about 15-20 cm of length, cut along the machine direction (namely along the direction of unwinding of the roll) were obtained from the film of Example 11, heat-sealed on itself with the sealant layers facing each other (i.e. in/in seals, 12 specimens) and heat-sealed on itself with the sealant layer facing the outer layer opposite the sealant layer (i.e. in/out seals, 12 specimens). Such heat-sealed films were manually manufactured using the laboratory equipment Gandus Medical H 610 (hot bar, sealing occurred along transverse direction, sealing time 1 sec, sealing temperatures: 100° C., 110° C., 120° C., 130° C., 140° C., 150° C., 160° C., 170° C., 180° C., 190° C., 200° C.).

The specimens of the sealed films were manually separated in order to provide detached film portions sufficient to be fixed into the lower jaw and into the upper jaw of a dynamometer. The area to be tested was positioned in the middle of the two jaws of the dynamometer, and an adequate pre-tensioning between the two extremities of the fixed sample was applied.

The instrument measured the force needed to separate the two sealed films, in particular it measured the force applied for the opening of 0.8 cm of the seal for each specimen (g/inch).

The average value of the opening force measured on the 12 specimens of the film sealed in/in and on the 12 specimens of the film sealed in/out was calculated.

The Dynamometer Conditions were:
  equipment: Instron 5564
  starting jaw distance: 5 cm
  crosshead speed: 300 mm/min,
  seal width: 0.8 cm.

The following Table 6 reports, for the tested specimens, the average of seal strength values measured and the standard deviation.

TABLE 6

| Seal temp (° C.) | Seal strength in/in (g/inch) | | Seal strength in/out (g/inch) | |
|---|---|---|---|---|
| | Average | Standard deviation | Average | Standard deviation |
| 100° C. | No seal | — | No seal | — |
| 110° C. | 940 | 60 | No seal | — |
| 120° C. | 920 | 44 | No seal | — |
| 130° C. | 1070 | 65 | 350 | 219 |
| 140° C. | 995 | 43 | 590 | 373 |
| 150° C. | 1120 | 36 | 850 | 363 |
| 160° C. | 1350 | 62 | 1150 | 39 |
| 170° C. | 1850 | 40 | 1440 | 124 |
| 180° C. | 2430 | 66 | 1750 | 99 |
| 190° C. | 2900 | 45 | 1600 | 340 |
| 200° C. | 3260 | 48 | 2270 | 230 |

The film of the invention showed good performances in terms of in/in sealing and easy opening behaviour in the range from 110° C. to 190° C., with better results in the range from 110° C. to 160° C.

As regards in/out sealing and easy opening behaviour, the film of the invention showed good performances in the range from 140° C. to 200° C., with better results in the range from 150° C. to 190° C.

The invention claimed is:

1. A fully thermoplastic heat sealable, optionally oriented, multilayer polyester based film comprising at least the following layers:

1) A heat-sealable polyester based outer layer;

2) An inner layer placed between layer 1) and layer 3) comprising at least 80 wt % of one or more polyesters and between 1 wt % and 20 wt % with respect to the total weight of the layer of one or more further polymers selected from the group consisting of polyolefins, ethylene vinyl acetate copolymers (EVA), ethylene (meth)acrylate/(meth)acrylic acid copolymers and mixtures thereof; and 3) A polyester based layer;

wherein the multilayer polyester based film is heat shrinkable with a percentage of free shrink at 120° C. of at least 15% in longitudinal and/or transverse direction, measured in oil according to ASTM D 2732; and wherein the multilayer polyester based film has either:
    i. an in/in seal opening force of between 850 g/inch and 1500 g/inch sealed over the entirety of the range from 110° C. to 160° C.; or
    ii. an in/out seal opening force of between 800 g/inch and 1800 g/inch sealed over the entirety of the range from 150° C. to 190° C.;

opening force being measured by having film specimens having dimensions of 2.54 cm of width and about 15-20 cm of length, cut along the machine direction being sealed on itself with the heat-sealable polyester based outer layer facing each other for in/in seals or heat-sealed on itself with the heat-sealable polyester based outer layer facing an outer layer opposite the heat-sealable polyester based outer layer for in/out seals;

hot bar sealing along the transverse direction with a sealing time of 1 second at the temperature listed above in i. and ii., the specimens fixed into the lower jaw and into the upper jaw of a dynamometer; the test area positioned in the middle of the two jaws of the dynamometer; the measure force applied for the opening of 0.8 cm of the seal in g/inch; dynamometer conditions set as follows:
      equipment: Instron 5564,
      starting jaw distance: 5 cm,
      crosshead speed: 300 mm/min,
      seal width: 0.8 cm.

2. The heat sealable film according to claim 1 wherein layer 2) adheres to layer 1) and to layer 3).

3. The heat sealable film according to claim 1, wherein said layer 2) comprises at least 85 wt %, of one or more polyesters and wherein said layer 2) comprises between 1 wt % and 10 wt % of one or more further polymers selected from the group consisting of polyolefins, ethylene vinyl acetate copolymers (EVA), ethylene (meth)acrylate/(meth) acrylic acid copolymers and mixtures thereof.

4. The heat sealable film according to any one of claim 1, wherein said polyolefins comprised in layer 2) are selected from the group consisting of ethylene polymers, propylene polymers, butylene polymers and mixtures thereof.

5. The heat sealable film according to claim 4 wherein said ethylene polymers are selected from the group of ethylene copolymers, ethylene alpha olefin copolymers, ethylene ($C_4$-$C_{10}$) alpha olefin copolymers, and linear low density polyethylene (LLDPE) and/or said propylene polymers are selected from propylene copolymers, or propylene alpha olefin copolymers and/or said butylene polymers are selected from butylene copolymers, or butylene alpha olefin copolymers.

6. The heat sealable film according to claim 1, wherein said polyolefins comprised in layer 2) are modified polyolefins, anhydride modified polyolefins, or maleic anhydride modified polyolefins.

7. The heat sealable film according to claim 1 wherein said ethylene (meth)acrylate copolymers comprise members selected from ethylene $C_1$-$C_4$ alkyl (meth)acrylate copolymers, ethylene methyl (meth)acrylate copolymers, ethylene ethyl (meth)acrylate copolymers and ethylene-butyl (meth) acrylate copolymers, ethylene methylacrylate copolymers, and ionomers.

8. The heat sealable film according to claim 7, wherein said ethylene (meth)acrylate copolymers are ethylene methylacrylate copolymers comprising between 5 and 40 wt % of methyl acrylate.

9. The heat sealable film according to claim 1, wherein said ethylene (meth)acrylate/(meth)acrylic acid copolymers are modified ethylene (meth)acrylate/(meth)acrylic acid copolymers, anhydride modified ethylene (meth)acrylate/ (meth)acrylic acid copolymers, or maleic anhydride modified ethylene (meth)acrylate/(meth)acrylic acid copolymers.

10. The heat sealable film according to claim 1, wherein said one or more polyesters comprised in layer 2) are selected from the group consisting of poly(ethylene terephthalate) (PET), glycol-modified poly(ethylene terephthalate) (PETG) and a mixture of PET and PETG.

11. The heat sealable film according to claim 1, wherein the heat sealable layer 1) comprises at least 90 wt % of one or more polyesters.

12. The heat sealable film according to claim 1, wherein the film comprises an outer layer of the film, opposite to the heat sealable layer 1), said outer layer comprising at least 90 wt % of one or more polyesters.

13. The heat sealable film according to claim 12, wherein said outer layer is layer 3).

14. The heat sealable film according to claim 1, wherein the overall composition of the film comprises at least 75 wt % of polyesters, polyesters of aromatic dicarboxylic acids, or polyesters of terephthalic acid.

15. The heat sealable film according to claim 1 wherein layer 3) has a thickness of at least 20% of the total thickness of the film.

16. The heat sealable film according to claim 1 wherein: (i) the heat-sealable layer 1) has a thickness comprised between 0.5 and 15 microns; and/or (ii) layer 2) has a thickness comprised between 1 and 15 microns; and/or (iii) layer 3) has a thickness comprised between 5 and 60 microns.

17. The heat sealable film according to claim 1, which is biaxially oriented, with an orientation ratio between about 2:1 and about 5:1 in both longitudinal and transverse direction.

18. The heat sealable film according to claim 1, wherein layer 3) is an inner layer, comprising at least 90 wt % of one or more polyesters.

19. The heat sealable film according to claim 1 wherein the film has a Dopack value of at least 0.25 when sealed onto a Silver Plastic APET 1826 tray, using a Sealpac A7 machine with a 1826 OC (Outside Cut) tool, equipped with a rounded seal bar (w=4 mm; r=8 mm), at a sealing temperature of 140° C.

20. A package comprising a container, a product placed into said container and a lid made of a heat sealable film, wherein the heat-sealable layer of the film is in contact with faces or faces the product, the film being hermetically sealed onto said container, wherein the container is selected from CPET, APET, APET/CPET and RPET containers, the heat sealable film comprising at least the following layers:

1) a heat-sealable polyester based outer layer,
2) an inner layer placed between layer 1) and layer 3) comprising at least 80 wt % of one or more polyesters and between 1 wt % and 20 wt % with respect to the total weight of the layer of one or more further polymers selected from the group consisting of polyolefins, ethylene vinyl acetate copolymers (EVA), ethylene (meth)acrylate/(meth)acrylic acid copolymers and mixtures thereof; and
3) a polyester based layer,
wherein the multilayer polyester based film is heat shrinkable with a percentage of free shrink at 120° C. of at least 15% in longitudinal and/or transverse direction, measured in oil according to ASTM D 2735; and
wherein the heat sealable film has either:
i. an in/in seal opening force of between 850 g/inch and 1500 g/inch sealed over the entirety of the range from 110° C. to 160° C.; or
ii. an in/out seal opening force of between 800 g/inch and 1800 g/inch sealed over the entirety of the range from 150° C. to 190° C.;
opening force being measured by having film specimens having dimensions of 2.54 cm of width and about 15-20 cm of length, cut along the machine direction being sealed on itself with the heat-sealable polyester based outer layer facing each other for in/in seals or heat-sealed on itself with heat-sealable polyester based outer layer facing an outer layer opposite the heat-sealable polyester based outer layer for in/out seals, hot bar sealing along the transverse direction with a sealing time of 1 second at the temperature listed above in i. and ii., the specimens fixed into the lower jaw and into the upper jaw of a dynamometer, the test area positioned in the middle of the two jaws of the dynamometer, the measure force applied for the opening of 0.8 cm of the seal in g/inch, dynamometer conditions set as follows:
equipment: Instron 5564
starting jaw distance: 5 cm,
crosshead speed: 300 mm/min,
seal width: 0.8 cm.

21. A flexible container obtainable by heat-sealing a heat-sealable film onto itself, or by heat-sealing two films, of which at least one is a heat sealable film, wherein the heat sealable film comprises at least the following layers:

1) a heat-sealable polyester based outer layer,
2) an inner layer placed between layer 1) and layer 3) comprising at least 80 wt % of one or more polyesters and between 1 wt % and 20 wt % with respect to the total weight of the layer of one or more further polymers selected from the group consisting of polyolefins, ethylene vinyl acetate copolymers (EVA), ethylene (meth)acrylate/(meth)acrylic acid copolymers and mixtures thereof; and
3) a polyester based layer,
wherein the multilayer polyester based film is heat shrinkable with a percentage of free shrink at 120° C. of at least 15% in longitudinal and/or transverse direction, measured in oil according to ASTM D 2735; and
wherein the heat sealable film has either:
i. an in/in seal opening force of between 850 g/inch and 1500 g/inch sealed over the entirety of the range from 110° C. to 160° C.; or
ii. an in/out seal opening force of between 800 g/inch and 1800 g/inch sealed over the entirety of the range from 150° C. to 190° C.;
opening force being measured by having film specimens having dimensions of 2.54 cm of width and about 15-20 cm of length, cut along the machine direction being sealed on itself with the heat-sealable polyester based outer layer facing each other for in/in seals or heat-sealed on itself with heat-sealable polyester based outer layer facing an outer layer opposite the heat-sealable polyester based outer layer for in/out seals, hot bar sealing along the transverse direction with a sealing time of 1 second at the temperature listed above in i. and ii., the specimens fixed into the lower jaw and into the upper jaw of a dynamometer, the test area positioned in the middle of the two jaws of the dynamometer, the measure force applied for the opening of 0.8 cm of the seal in g/inch, dynamometer conditions set as follows:
equipment: Instron 5564
starting jaw distance: 5 cm,
crosshead speed: 300 mm/min,
seal width: 0.8 cm.

* * * * *